United States Patent
Kim et al.

(10) Patent No.: US 10,848,216 B2
(45) Date of Patent: Nov. 24, 2020

(54) METHOD AND APPARATUS FOR TRANSMITTING UPLINK BEAM SCANNING SIGNAL IN WIRELESS COMMUNICATION SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/739,867

(22) PCT Filed: Jun. 27, 2016

(86) PCT No.: PCT/KR2016/006841
§ 371 (c)(1),
(2) Date: Dec. 26, 2017

(87) PCT Pub. No.: WO2016/209055
PCT Pub. Date: Dec. 29, 2016

(65) Prior Publication Data
US 2018/0191417 A1     Jul. 5, 2018

Related U.S. Application Data

(60) Provisional application No. 62/184,914, filed on Jun. 26, 2015.

(51) Int. Cl.
*H04B 7/06*     (2006.01)
*H04B 7/04*     (2017.01)
(Continued)

(52) U.S. Cl.
CPC ............ *H04B 7/0617* (2013.01); *H04B 7/04* (2013.01); *H04B 7/0413* (2013.01); *H04N 1/00885* (2013.01); *H04W 72/02* (2013.01)

(58) Field of Classification Search
CPC ............ H04N 1/4413; H04N 1/00774; H04N 1/00885; H04N 2201/3236; H04N 9/8227
(Continued)

(56) References Cited

U.S. PATENT DOCUMENTS

2005/0215289 A1*   9/2005   Rensburg ............ H04W 52/245
                                                                           455/562.1
2007/0149236 A1*   6/2007   Naden .................. H04B 7/0434
                                                                           455/522
(Continued)

FOREIGN PATENT DOCUMENTS

EP            1467437         10/2004
WO         2014054908        4/2014

OTHER PUBLICATIONS

PCT International Application No. PCT/KR2016/006841, International Search Report dated Sep. 27, 2016, 4 pages.

*Primary Examiner* — David C Payne
*Assistant Examiner* — Sarah Hassan
(74) *Attorney, Agent, or Firm* — Lee Hong Degerman Kang & Waimey

(57) ABSTRACT

A method and apparatus for transmitting an uplink beam scanning signal in a wireless communication system is provided. A terminal first performs downlink beam scanning, and then transmits the uplink beam scanning signal to a base station through a time-frequency resource corresponding to a beam selected according to the downlink beam scanning. The terminal may transmit information on the downlink beam scanning to the base station. The base station may divide a plurality of terminals into a plurality of groups on the basis of information on downlink beam scanning, (Continued)

received from the plurality of terminals, and perform uplink beam scanning for only uplink beams which are selected corresponding to the plurality of groups among all the uplink beams.

2 Claims, 14 Drawing Sheets

(51) Int. Cl.
  *H04N 1/00* (2006.01)
  *H04B 7/0413* (2017.01)
  *H04W 72/02* (2009.01)
(58) Field of Classification Search
  USPC .......................................... 375/267; 370/442
  See application file for complete search history.

(56) References Cited

U.S. PATENT DOCUMENTS

| | | | |
|---|---|---|---|
| 2013/0039256 A1* | 2/2013 | Shin | H04B 7/15521 370/315 |
| 2013/0083774 A1* | 4/2013 | Son | H04W 36/0055 370/331 |
| 2013/0308714 A1 | 11/2013 | Xu et al. | |
| 2013/0315184 A1* | 11/2013 | Kim | H04W 72/0406 370/329 |
| 2014/0003369 A1* | 1/2014 | Josiam | H04L 5/0094 370/329 |
| 2014/0073329 A1 | 3/2014 | Kang et al. | |
| 2016/0099761 A1* | 4/2016 | Chen | H04B 7/0408 370/336 |
| 2017/0134966 A1* | 5/2017 | He | H04W 16/28 |
| 2017/0366244 A1* | 12/2017 | Lee | H04W 24/10 |

\* cited by examiner

METHOD AND APPARATUS FOR TRANSMITTING UPLINK BEAM SCANNING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2016/006841, filed on Jun. 27, 2016, which claims the benefit of U.S. Provisional Application No. 62/184,914, filed on Jun. 26, 2015, the contents of which are all hereby incorporated by reference herein in their entirety.

BACKGROUND OF THE INVENTION

Field of the Invention

The present invention relates to wireless communication and more particularly, a method and apparatus for transmitting an uplink beam scanning signal in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As a way to improve the efficiency of limited resources, so-called multi-antenna technology is being actively developed which achieves diversity gain by putting multiple antennas on the transmitter and receiver to cover more spatial regions for resource utilization, and which increases transmission capacity by transmitting data in parallel through each antenna. Multi-antenna technology may employ beamforming and/or precoding to improve signal-to-noise ratio (SNR). In closed-loop systems that can use feedback information at the transmitting end, beamforming and/or precoding may be used to maximize SNR through such feedback information. Beamforming is broadly classified into analog beamforming and digital beamforming.

Massive multiple-input multiple-output (MIMO) is a multi-antenna technology in which tens of antennas or even more, which is a lot more than now, are put into a base station to achieve higher data rates and higher energy efficiency. When conventional analog beamforming and/or digital beamforming is directly used in massive MIMO, signal processing and/or hardware implementation can get very complex, or the performance increase through the use of multiple antennas is only slight and the flexibility of resource allocation may be reduced. Consequently, the use of hybrid beamforming, a combination of conventional analog and digital beamforming, in massive MIMO is under discussion.

Since the hybrid beamforming basically relies on the beam scanning operation, an uplink beam scanning procedure for beam estimation is inevitably required. In particular, when a plurality of UEs transmit an uplink beam scanning preamble, there needs a method not only being capable of multiplexing uplink beam scanning preambles but also enabling a base station to receive an uplink beam scanning preamble in a reliable manner.

SUMMARY OF THE INVENTION

The present invention provides a method and an apparatus for transmitting an uplink beam scanning signal in a wireless communication system. The present invention provides a method and an apparatus for scanning an uplink beam by taking into account the orientation of a user equipment (UE). The present invention provides a multi-user based uplink beam scanning method. The present invention provides an uplink beam scanning method that enables a base station to configure reception beamforming by using downlink beam scanning information and to improve accuracy of uplink beam scanning by performing grouping of UEs.

In an aspect, a method for transmitting an uplink beam scanning signal by a user equipment (UE) in a wireless communication system is provided. The method includes performing downlink beam scanning, and transmitting the uplink beam scanning signal to a base station through a time-frequency resource corresponding to a beam selected according to the downlink beam scanning.

In another aspect, a method for performing uplink beam scanning by a base station in a wireless communication system is provided. The method includes dividing a plurality of UEs into a plurality of groups on the basis of information about downlink beam scanning received from the plurality of UEs, and performing uplink beam scanning only for an uplink beam selected corresponding to the plurality of groups among entire uplink beams.

A UE can transmit an uplink beam scanning signal in an effective manner. Also, uplink beams can be scanned in consideration of the orientation of a UE, and therefore accuracy of the uplink beam scanning can be improved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
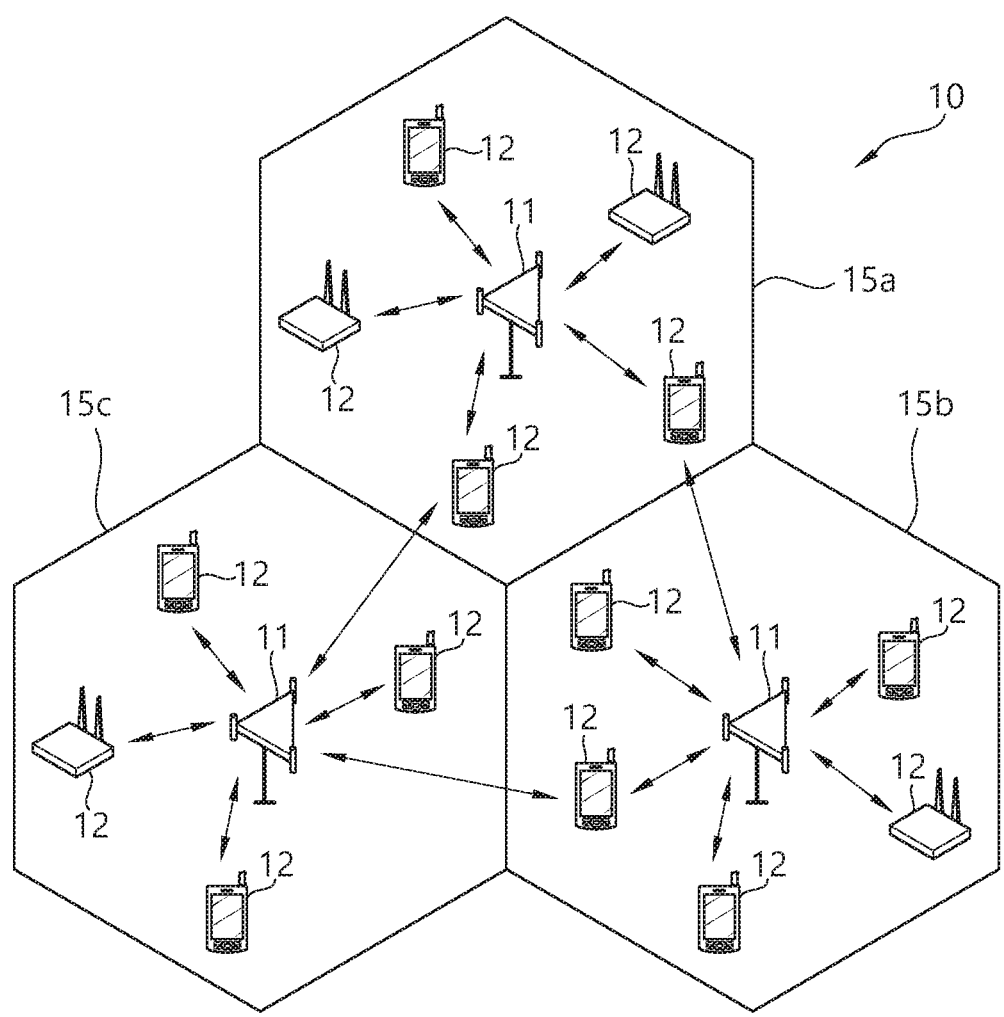
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The cellular system includes a different cell adjacent to the serving cell. The different cell adjacent to the serving cell is called a neighbor cell. ABS providing a communication service to the neighbor cell is called a neighbor BS. The serving cell and the neighbor cell are relatively determined based on a UE.

This technique can be used for downlink (DL) or uplink (UL). In general, DL refers to communication from the BS 11 to the UE 12, and UL refers to communication from the UE 12 to the BS 11. In DL, a transmitter may be part of the BS 11 and a receiver may be part of the UE 12. In UL, a transmitter may be part of the UE 12 and a receiver may be part of the BS 11.

Figure 2:
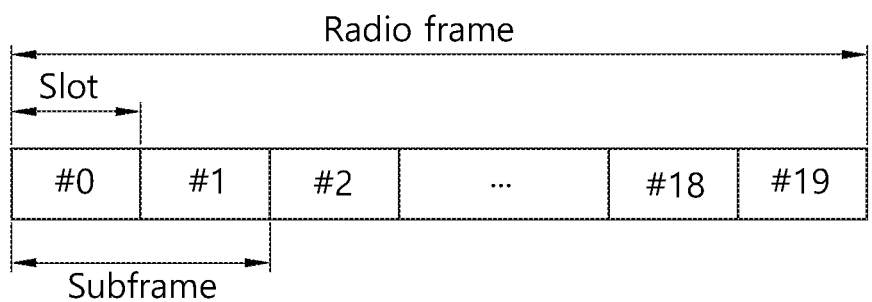
FIG. 2 shows a structure of a radio frame of 3GPP LTE.

FIG. 2 shows a structure of a radio frame of 3GPP LTE. Referring to FIG. 2, a radio frame consists of 10 subframes, and a subframe consists of two slots. Slots within the radio frame are numbered from #0 to #19. A transmission time interval (TTI) is a basic scheduling unit for data transmission. In 3GPP LTE, one TTI may be equal to the time it takes for one subframe to be transmitted. One radio frame may have a length of 10 ms, one subframe may have a length of 1 ms, and one slot may have a length of 0.5 ms.

One slot includes a plurality of orthogonal frequency division multiplexing (OFDM) symbols in time domain and a plurality of subcarriers in frequency domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners. 3GPP LTE defines one slot as 7 OFDM symbols in a normal cyclic prefix (CP) and one slot as 6 OFDM symbols in an extended CP.

When a UE is powered on or newly enters a cell, the UE may perform a cell search procedure such as acquiring time and frequency synchronization with the cell and detecting a physical cell identity (PCI) of the cell. To this end, the UE may receive a synchronization signal from the base station, synchronize with the base station, and obtain information such as a cell identifier or the like. The synchronization signal may include a primary synchronization signal (PSS) and a secondary synchronization signal (SSS).

The need for hybrid beamforming will be described. Beamforming technology using multiple antennas may be broadly divided into analog beamforming technology (hereinafter, "analog beamforming") and digital beamforming technology (hereinafter, "digital beamforming") depending on where a beamforming weight vector (or precoding vector) is applied.

Figure 3:
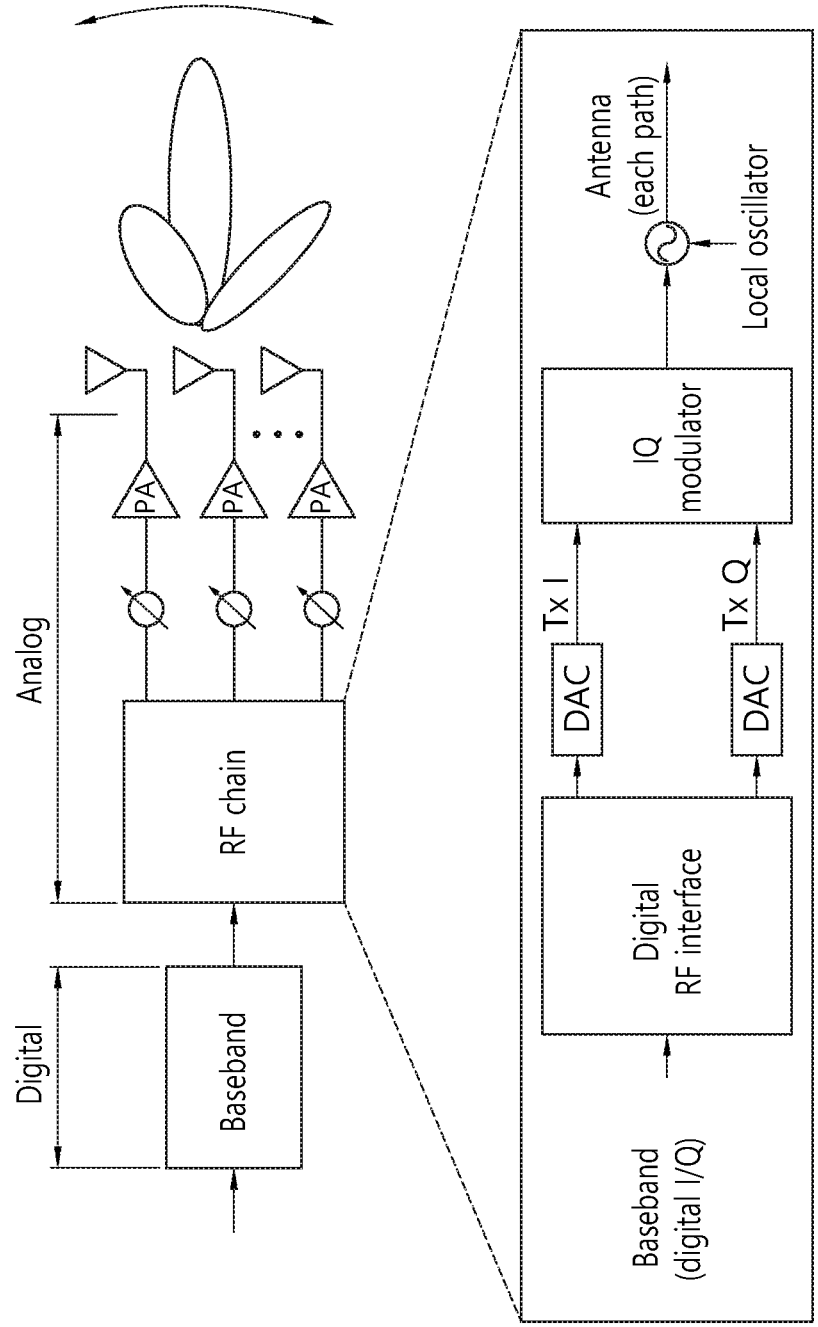
FIG. 3 is a block diagram of a transmitter including an analog beamformer and a radio frequency (RF) chain.

FIG. 3 is a block diagram of a transmitter including an analog beamformer and a radio frequency (RF) chain. Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 3, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 4:
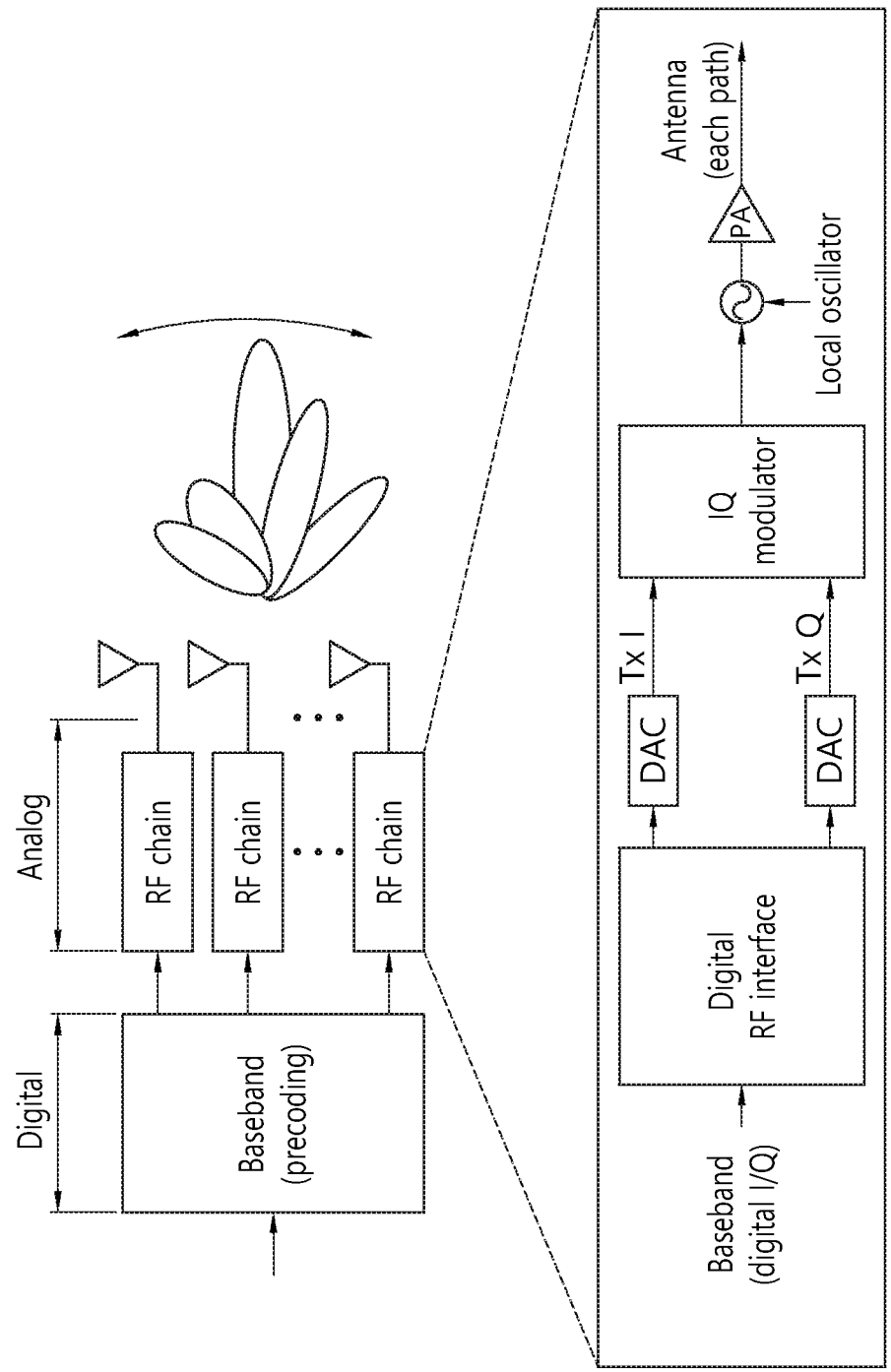
FIG. 4 is a block diagram of a transmitter including a digital beamformer and a RF chain.

FIG. 4 is a block diagram of a transmitter including a digital beamformer and a RF chain. In digital beamforming, as opposed to analog beamforming, a beam is formed in the digital stage by a baseband process, in order to maximize diversity and multiplexing gain in an MIMO environment. Referring to FIG. 4, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Hybrid beamforming will be described. As described above, the purpose of hybrid beamforming is to configure a transmitting end that provides the benefits of analog beamforming and the benefits of digital beamforming in a massive MIMO environment.

Figure 5:
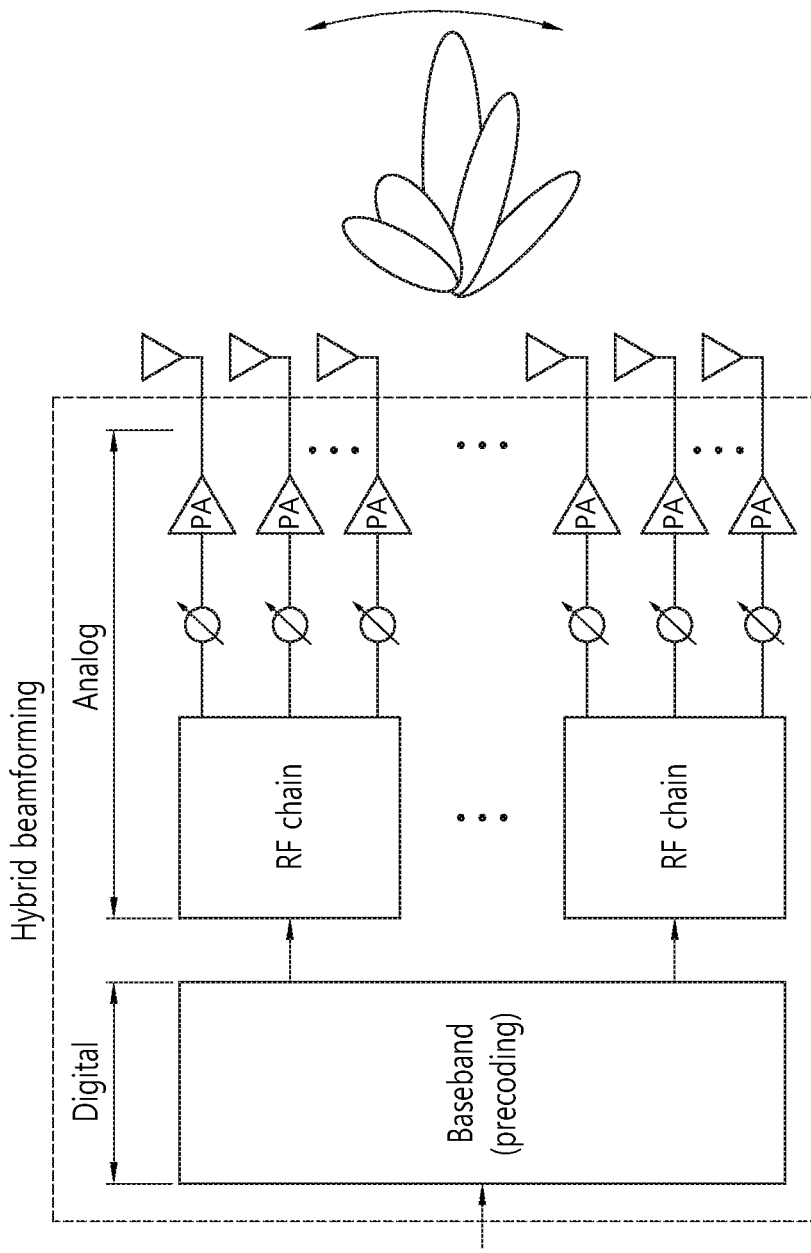
FIG. 5 is a block diagram of a transmitter including a hybrid beamformer.

FIG. 5 is a block diagram of a transmitter including a hybrid beamformer. Referring to FIG. 5, hybrid beamforming may basically allow for forming a coarse beam through analog beamforming and then a beam for multi-stream or multi-user transmission through digital beamforming. That is, hybrid beamforming exploits both analog beamforming and digital beamforming in order to lower the complexity of implementation at the transmitting end or hardware complexity.

A basic hybrid beamformer may have NtRF individual transmit antennas for each RF chain. Thus, the relationship between the total number of transmit antennas and the number of transmit antennas per RF chain is expressed by Nt=NtRF*NRF. NRF is the number of RF chains. Finally, signals that have passed through the PSs and PAs for each RF chain are sent independently to the transmit antennas. Equation 1 represents an example of a matrix operation-based system model of hybrid beamforming.

$$y_k = H_k F^{RF} F_k^{BB} s_k + z_k \qquad \text{<Equation 1>}$$

In Equation 1, yk is the received signal vector (Nr*1) at the kth subcarrier, Hk is the Nr*Nt channel at the kth subcarrier, FRF is the Nt*NRF RF precoder at all subcarriers (which is the same for all subcarriers), FkBB is the NRF*Ns baseband precoder at the kth subcarrier (which may vary for each subcarrier), sk is the transmitted signal vector (Ns*1) at the kth subcarrier, and zk is the noise signal vector k (Nr*1) at the kth subcarrier. In addition, k is the subcarrier index (k=0,1,2, . . . , NFFT-1), NFFT is the size of fast Fourier transform (FFT), i.e. the total number of subcarriers, and NRF is the total number of RF chains. Nt is the total number of antennas at the transmitting end, NtRF is the number of transmit antennas for each RF chain, Nr is the total number of antennas at the receiving end, and Ns is the number of transmitted data streams.

For subcarrier k, the above Equation 1 can be solved and expanded as in Equation 2.

$$\begin{bmatrix} y^{(1)} \\ \vdots \\ y^{(Nr)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} F^{RF} \qquad \text{<Equation 2>}$$

$$\left( \begin{bmatrix} v_{1,1} & v_{1,2} & \cdots & v_{N_{RF},N_S} \\ v_{2,1} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix} \right) + \begin{bmatrix} z^{(1)} \\ \vdots \\ z^{(Nr)} \end{bmatrix}$$

Moreover, an equivalent precoding matrix FRF of analog beamforming created by the PSs and PAs after the RF chain is represented by Equation 3.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix} \qquad \text{<Equation 3>}$$

The precoding weight for each RF chain of FRF is represented by Equation 4.

$$w^j_{N_t^{RF}} = \begin{bmatrix} w^j_1 \\ w^j_2 \\ \vdots \\ w^j_{N_t^{RF}} \end{bmatrix} \quad \langle \text{Equation 4} \rangle$$

Technical issues with hybrid beamforming are as follows.

(1) Difficulties in optimizing analog/digital beamforming designs: While digital beamforming allows for forming individual beams for different users using the same time-frequency resource, analog beamforming is limited in that a common beam has to be formed using the same time-frequency resource. This limitation may cause issues like a limit on the largest possible number of ranks corresponding to the number of RF chains, the difficulty of subband beam control using an RF beamformer, and/or the difficulty of optimization of beamforming resolution/granularity.

(2) Need for a specific method of common signal transmission: In analog beamforming, which forms a beam only in a particular direction on the same time-frequency resource, it is not possible to form multiple beams simultaneously in the directions of all UEs. Thus, DL/UL control channels, reference signals, broadcast channels, synchronization signals, etc., may not be transmitted simultaneously to all UEs that may be distributed over all areas in a cell. There are also problems which occur when a UE transmits physical random access channel (PRACH), physical uplink control channel (PUCCH), and/or sounding RS (SRS) over UL.

(3) Need for the design of more pilots and feedback to determine an analog/digital beam: In the case of estimation for analog/digital beams, the digital beam may be estimated directly by using a conventional orthogonal pilot allocation scheme, whereas the analog beam requires as long a time-duration as the number of beam candidates. This means that the more time delay is needed for analog beam estimation, and this may cause a system loss. Moreover, simultaneously estimating both digital and analog beams may lead to a considerable increase in complexity.

(4) Difficulties in supporting analog beam-based spatial division multiple access (SDMA) and FDMA: Digital beamforming allows to freely form beams for multi-users/streams, whereas, in analog beamforming, the same beam is formed for the entire transmission band, making it difficult to form an independent beam per user or per stream. In particular, it is hard to support FDMA (e.g. OFDMA) through orthogonal frequency resource allocation, thus making the optimization of frequency resource efficiency impractical.

Among the technical issues of the hybrid beamforming described above, the present invention described below can provide a method for optimizing the analog/digital beam design for the hybrid beamforming.

Figure 6:
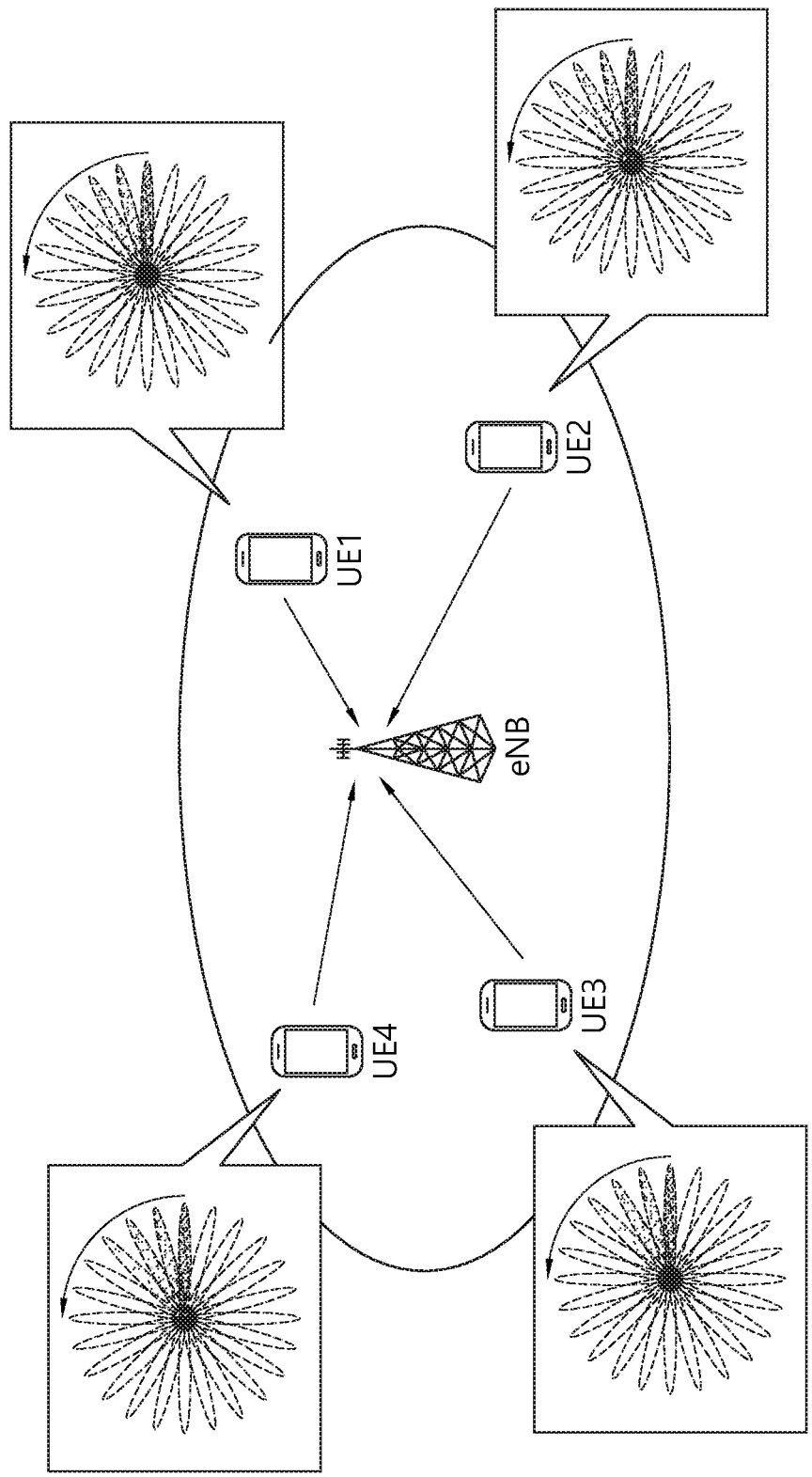
FIG. 6 shows a situation in which a plurality of UEs transmit analog beams in the uplink.

FIG. 6 illustrates a situation in which a plurality of UEs transmit analog beams in the uplink. To increase accuracy of uplink beam scanning, a base station may perform reception beamforming. In the analog beamforming or hybrid beamforming combining the analog beamforming and digital beamforming, there may arise a problem that analog beam scanning time increases in the uplink. The analog beamforming inevitably requires an analog beam training period. When analog beams transmitted by a plurality of UEs are scanned in the uplink, the analog beam training period may increase by the number of uplink beam scanning candidates.

More specifically, suppose the number of beams of a transmitting end, i.e. UE, is $K_T$, and the number of beams of a receiving end, i.e. base station, is $K_R$. Then the number of candidates of uplink beam scanning required for each UE becomes $K_T*K_R$. In addition, if the total number of UEs transmitting uplink beams, $N_{UE}$, and the time period for scanning each beam, $t_s$, are considered, the total uplink beam scanning time becomes $T_S=N_{UE}*t_s*(K_T*K_R)$. Meanwhile, if it is assumed that the base station has already obtained uplink beams by using the channel reciprocity property after downlink beam scanning is completed, received beams of the base station may be assumed to be omni-beams. In other words, it may be assumed that $K_R$, the number of beams of the base station, the receiving end, is 1. Therefore, the total uplink beam scanning time may be calculated by $T_S=N_{UE}*t_s*K_T$.

In general, depending on the antenna structure of each UE, the hybrid beamformer may be formed differently. More specifically, according to a different configuration of the hybrid beamformer for each UE, beam width for analog beam scanning may be varied, and the number of candidates of uplink beam scanning for each UE may be changed. Therefore, an uplink beam scanning procedure that takes into account the number of transmission beams that differs for each UE has to be designed. When the uplink beam scanning procedure that differs for each UE is not designed, the longest uplink beam scanning time has to be used with respect to the UE holding the maximum number of transmission beams. As a result, the uplink beam scanning procedure incurs high complexity, and uplink beam scanning time and overhead increase, leading to a large system loss.

Figure 7:
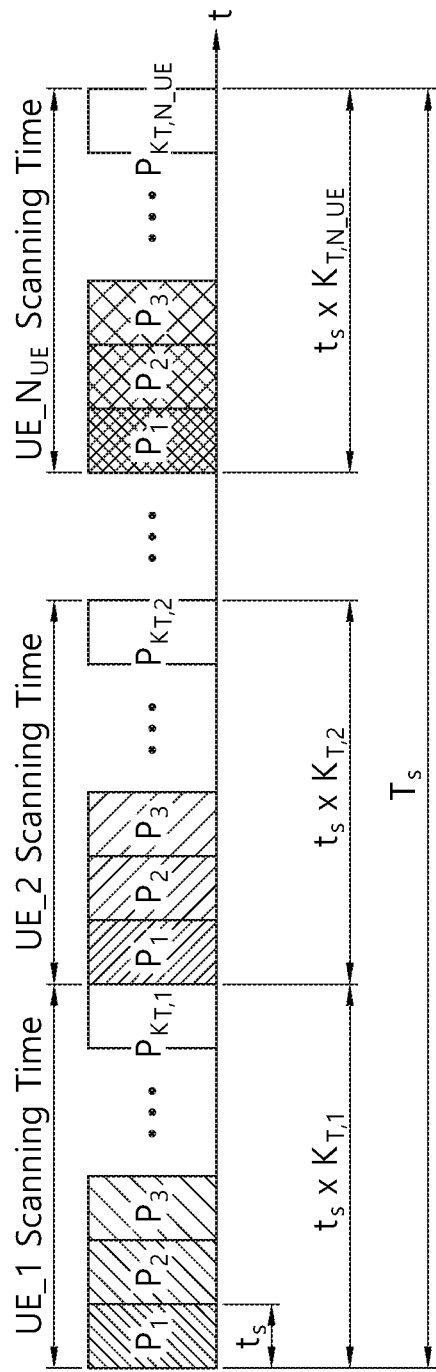
FIG. 7 shows scanning times when a plurality of UEs transmit analog beams.

FIG. 7 illustrates scanning times when a plurality of UEs transmit analog beams. FIG. 7 illustrates the total uplink beam scanning time when the UEs have different antenna structures. Referring to FIG. 7, the scanning time for each beam is $t_s$, the number of uplink beams that UE_1 transmits is $K_{T,1}$, the number of uplink beams that UE_2 transmits is $K_{T,2}$, and the number of uplink beams that UE_$N_{UE}$ transmits is $K_{T,N\_UE}$. Therefore, the uplink beam scanning time that UE_1 transmits is $t_s*K_{T,1}$, the uplink beam scanning time that UE_2 transmits is $t_s*K_{T,2}$, and the uplink beam scanning time that UE_$N_{UE}$ transmits is $t_s*K_{T,N\_UE}$. As a result, the total uplink beam scanning time may be expressed by the following Equation 5.

$$T_S = t_s(K_{T,1} + K_{T,2} + K_{T,3} + \ldots + K_{T,N_{UE}}) = t_s \cdot \sum_{i=1}^{N_{UE}} K_{T,i} \quad \langle \text{Equation 5} \rangle$$

To solve the problem above, the present invention provides a method for scanning uplink beams by taking into account the orientation of a UE. According to the present invention, a UE may first perform downlink beam scanning, provide the information obtained from the scanning to a base station, and transmit an uplink beam scanning signal to the base station through a time-frequency resource corresponding to a selected downlink beam. The base station may perform grouping of UEs for uplink beam scanning on the basis of downlink beam scanning information fed back by the UEs and multiplex beam scanning preambles transmitted by UEs belonging to each group. Accordingly, the base station is allowed to perform reception beamforming-based uplink beam scanning, and thereby the complexity in the uplink beam scanning based on a plurality of UEs may be reduced and at the same time, the accuracy of the uplink beam scanning may be improved.

First, according to one embodiment of the present invention, a UE performs downlink beam scanning The UE may transmit information about the downlink beam scanning to the base station. The UE transmits the uplink beam scanning signal to the base station through the time-frequency resource corresponding to the beam selected according to the downlink beam scanning The base station may perform uplink beam scanning by using the uplink beam scanning signal transmitted from the UE. The uplink beam scanning signal may be either the PRACH or the SRS. The time-frequency resource may be either a PRACH resource through which the PRACH is transmitted or an SRS resource through which the SRS is transmitted.

Also, according to one embodiment of the present invention, the base station may group a plurality of UEs before uplink beam scanning. Since a base station usually performs uplink beam scanning after a UE's downlink beam scanning, the base station may receive feedback information about the downlink beam scanning selected by each UE. The base station may select those UEs having a common beam, namely the UEs oriented toward the same direction, on the basis of the information about the downlink beam scanning that each UE transmits and configure those UEs as belonging to the same group. More specifically, a base station may usually detect an uplink beam scanning preamble by using the following Equation 6. In what follows, it is assumed that an uplink beam is an analog beam, and depending on situations, the uplink beam may be a hybrid beam combining the analog beam with digital beamforming.

$$y = W^*_{RF} H P_c s + W^*_{RF} n \qquad \text{<Equation 6>}$$

In Equation 6, y represents a reception vector of the base station, $W_{RF^*}$ represents a reception beamformer of the base station, H presents an $N_{rx}*N_{tx}$ MIMO channel, s represents an uplink beam scanning preamble, and n represents a noise vector of a receiving end. Also, $P_c = P_{RF} * P_{BB}$, where $P_{RF}$ represents the analog precoder of a transmitting end, and $P_{BB}$ represents the digital precoder of the transmitting end.

Figure 8:
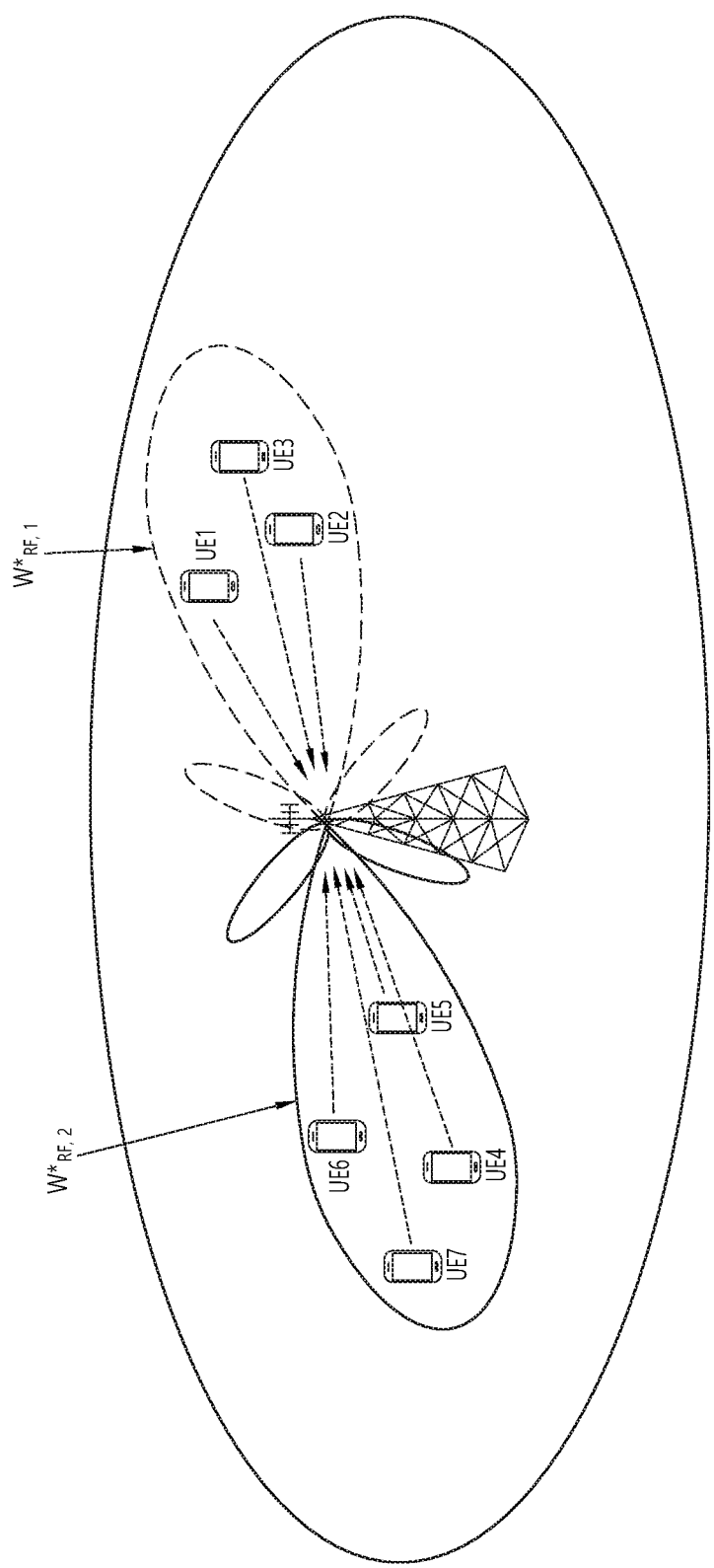
FIG. 8 shows one example of grouping of UEs and configuration of a reception beamformer according to one embodiment of the present invention.

FIG. 8 illustrates one example of grouping of UEs and configuration of a reception beamformer according to one embodiment of the present invention. Referring to FIG. 8, UE1, UE2, and UE3 are oriented toward a first direction, and UE4, UE5, UE6, and UE7 are oriented toward a second direction. The base station may group a plurality of UEs on the basis of the information about downlink beam scanning that each UE transmits. In other words, the UE1, UE2, and UE3 oriented toward the first direction may be grouped into a first group, for which a reception beamformer of $W_{RF,1^*}$ may be configured, while the UE4, UE5, UE6, and UE7 oriented toward the second direction may be grouped into a second group, for which a reception beamformer of $W_{RF,2^*}$ may be configured. In other words, if performing uplink beam scanning and reception beamforming on the UEs that have selected the same transmission beam by using the same precoder, the base station may receive the uplink beam scanning preamble that each UE transmits in a more reliable manner. Table 1 below is one example of grouping of UEs and configuration of a reception beamformer according to an embodiment of FIG. 8.

TABLE 1

| Reception beamformer | Group index | UE | A set of transmission precoders for each UE |
|---|---|---|---|
| $W_{RF,1^*}$ | 1 | UE #1 | {$P_1, P_2, P_3, P_4$} |
|  |  | UE #2 | {$P_1, P_2, P_3, P_4$} |
|  |  | UE #3 | {$P_1, P_2$} |
| $W_{RF,2^*}$ | 2 | UE #4 | {$P_1, P_2, P_3, P_4$} |
|  |  | UE #5 | {$P_1, P_2$} |
|  |  | UE #6 | {$P_1, P_2$} |
|  |  | UE #7 | {$P_1, P_2, P_3, P_4, P_5, P_6$} |
| ... | ... | ... | ... |

Also, according to one embodiment of the present invention, after grouping a plurality of UEs, the base station may directly use the information about downlink beam scanning that each UE transmits for uplink beamforming. In other words, instead of performing uplink beam scanning over the entire candidates of uplink beam scanning, the UE may perform the uplink beam scanning only for part of the candidates of the uplink beam scanning. In general, if the number of received beams of a base station is $N_{rx\_beam}$, the total uplink beam scanning time increases in proportion to $N_{rx\_beam}$. However, according to one embodiment of the present invention, the base station may determine or adjust the length of the uplink beam scanning interval flexibly by using the information about downlink beam scanning that each UE transmits. Accordingly, the base station may detect the uplink beam scanning preamble that the UE transmits more accurately. The uplink beam scanning preamble may be either the PRACH or SRS.

Figure 9:
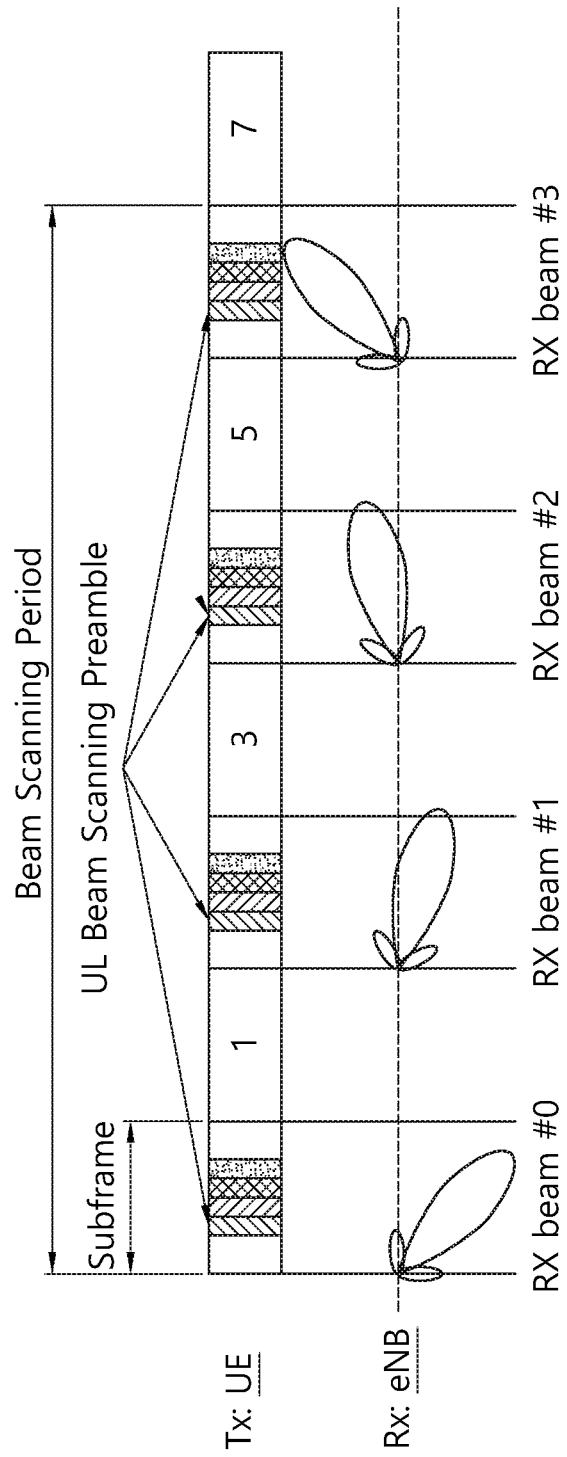
FIG. 9 shows one example of uplink beam scanning according to one embodiment of the present invention.

FIG. 9 illustrates one example of uplink beam scanning according to one embodiment of the present invention. Referring to FIG. 9, if the number of received beams of the base station, $N_{rx\_beam}$, is 4, it may indicate that a plurality of UEs subject to uplink beam scanning have been divided into four groups. At this time, each UE may transmit an uplink beam scanning preamble only at the subframe #0, #2, #4, and #6. For example, UEs belonging to the group #0 may transmit an uplink beam scanning preamble at the subframe #0, UEs belonging to the group #1, at the subframe #2, UEs belonging to the group #2, at the subframe #4, and UEs belonging to the group #3, at the subframe #6. Also, if the number of transmission beams of each UE, $N_{rx\_beam}$, is 4, each UE may transmit a total of four uplink beam scanning preambles within the corresponding subframe. The base station may perform uplink beam scanning by receiving an uplink beam scanning preamble that each UE transmits, and at this time, the uplink beam scanning period spans from the subframe #0 to the subframe #6.

A UE oriented toward a specific direction corresponding to a received beam of the base station may not exist. In this case, taking into account the number of received beams for which no corresponding UEs are found, the base station may adjust the period and/or length of the uplink beam scanning period. In other words, instead of configuring the uplink beam scanning period by taking into account the entire uplink beam scanning candidates, the base station may configure the uplink beam scanning period according to the number of UE groups on the basis of the information about downlink beam scanning fed back from the UEs.

Figure 10:
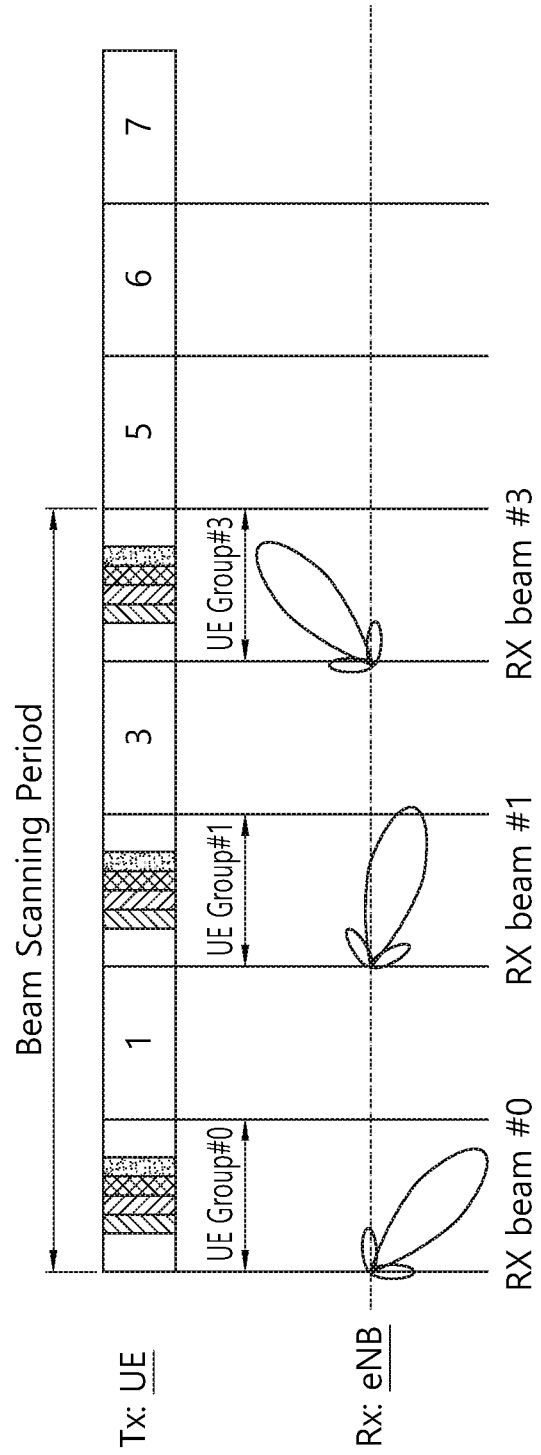
FIG. 10 shows one example of uplink beam scanning aligned to a received beam according to another embodiment of the present invention.

FIG. 10 illustrates one example of uplink beam scanning aligned to a received beam according to another embodiment of the present invention. Referring to FIG. 10, in response to four received beams of the base station, only UE group #0, UE group #1, and UE group #3 exist. In other words, no UEs corresponding to the UE group #2 are found. At this time, the base station may operate only the received beam #0, #1, and #3 that correspond to the existing UE groups. Accordingly, the uplink beam scanning period may be set adaptively and as a result, the uplink beam scanning period may be reduced. The base station may broadcast configuration information about the period and/or length of the uplink beam scanning period to the UEs and also update the configuration information if the grouping information of the UE is changed. The update period of the configuration information may be set to a multiple of a single uplink beam scanning period, and if the position and/or channel of the UE within a cell changes with a short period, the update period of the configuration information may also be shortened.

When no UEs oriented toward a specific direction corresponding to a received beam exist, the base station may set the uplink beam scanning period in which no corresponding UEs exist as a scanning muting period instead of changing the configuration of the uplink beam scanning period as described above. In other words, even if no UEs oriented toward a specific direction corresponding to a received beam of the base station exist, the uplink beam scanning period is maintained without being changed.

Figure 11:
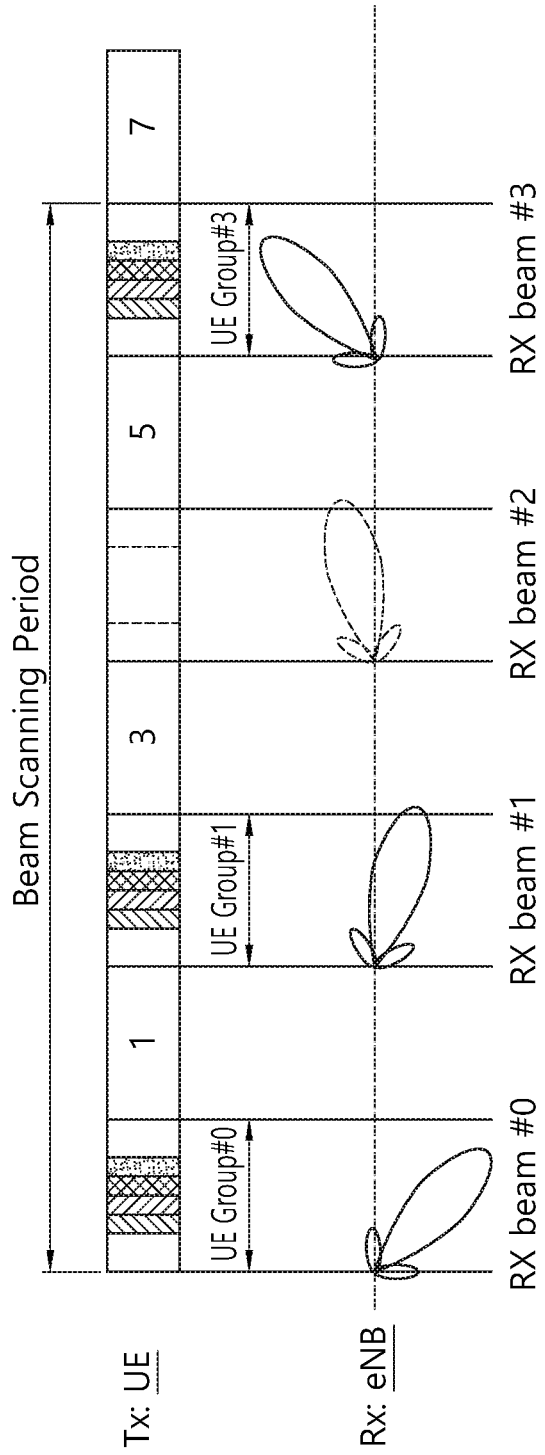
FIG. 11 shows one example of uplink beam scanning aligned to a received beam according to another embodiment of the present invention.

FIG. 11 illustrates one example of uplink beam scanning aligned to a received beam according to another embodiment of the present invention. Referring to FIG. 11, as in FIG. 10, in response to four received beams of the base station, only UE group #0, UE group #1, and UE group #3 exist. In other words, no UEs corresponding to the UE group #2 are found. At this time, the base station may operate only the received beam #0, #1, and #3 that correspond to the existing UE groups. However, instead of excluding the uplink beam scanning period corresponding to the received beam #2 from the whole uplink beam scanning period, the base station sets the corresponding uplink beam scanning period as a scanning muting period. In other words, since the UE does not transmit an uplink bean scanning preamble during the uplink beam scanning period corresponding to the received beam #2, the base station may not perform uplink beam scanning.

In addition, according to one embodiment of the present invention, UEs belonging to the same group may transmit uplink beam scanning preambles through multiplexing. In other words, the preambles of a plurality of UEs belonging to the same group for uplink beam scanning of the base station may be multiplexed with N repeating preamble symbols. As a multiplexing method, cyclic shift or orthogonal cover code (OCC) may be used. More specifically, each UE may transmit the same preamble sequence repeatedly at N preamble symbols. For example, each UE may transmit a beamformed preamble sequence to which precoding has been applied at the analog end repeatedly at N preamble symbols. The preamble sequence transmitted by a plurality of UEs may be multiplexed by using the orthogonal code among N preamble symbols. Similarly, each UE may transmit the same preamble sequence repeatedly for different preamble symbol intervals. The preamble sequence transmitted by a plurality of UEs may be multiplexed by using the orthogonal code among different preamble symbols. In other words, UEs belonging to different groups may be multiplexed by the orthogonal code.

Figure 12:
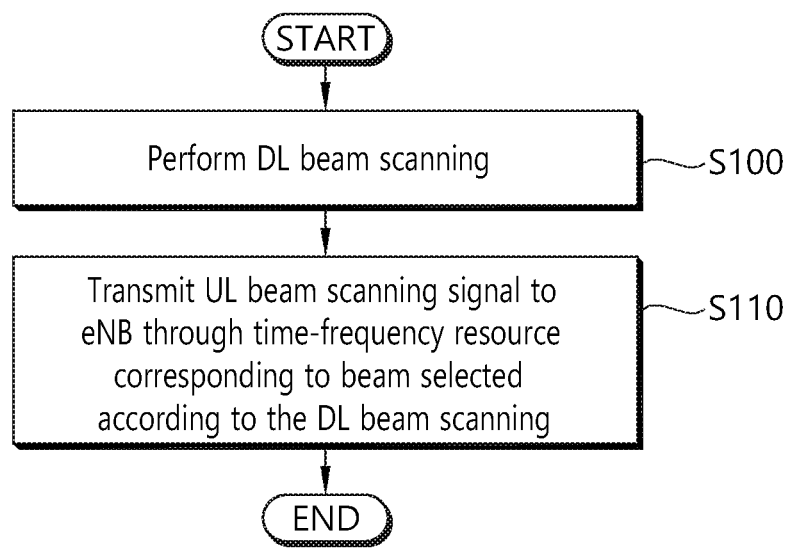
FIG. 12 shows a method for a UE to transmit an uplink beam scanning signal according to one embodiment of the present invention.

FIG. 12 illustrates a method for a UE to transmit an uplink beam scanning signal according to one embodiment of the present invention. Descriptions about the present invention given above may be applied to the embodiment of FIG. 12.

At step S100, the UE performs downlink beam scanning. The UE may transmit information about the downlink beam scanning to the base station.

At step S110, the UE transmits the uplink beam scanning signal to the base station through the time-frequency resource corresponding to a beam selected according to the downlink beam scanning The uplink beam scanning signal may be either the PRACH or the SRS. The time-frequency resource may be either a PRACH resource through which the PRACH is transmitted or an SRS resource through which the SRS is transmitted.

The UE may belong to one group configured by the base station. The UEs belonging to the one group may be oriented to face the same beam direction. Also, the same reception beamforming may be applied for the UEs belonging to the one group.

The uplink beam scanning signal may be transmitted within the uplink beam scanning period configured by the base station on the basis of the information about the downlink beam scanning The length of the uplink beam scanning period may correspond to the number of groups configured by the base station. At this time, the period in which no corresponding UEs exist among the uplink beam scanning periods may be set as a scanning muting period. Similarly, the length of the uplink beam scanning period may correspond to the number of groups to which corresponding UEs belong among a plurality of groups configured by the base station. The UE may receive information about the length and period of the uplink beam scanning period from the base station.

Figure 13:
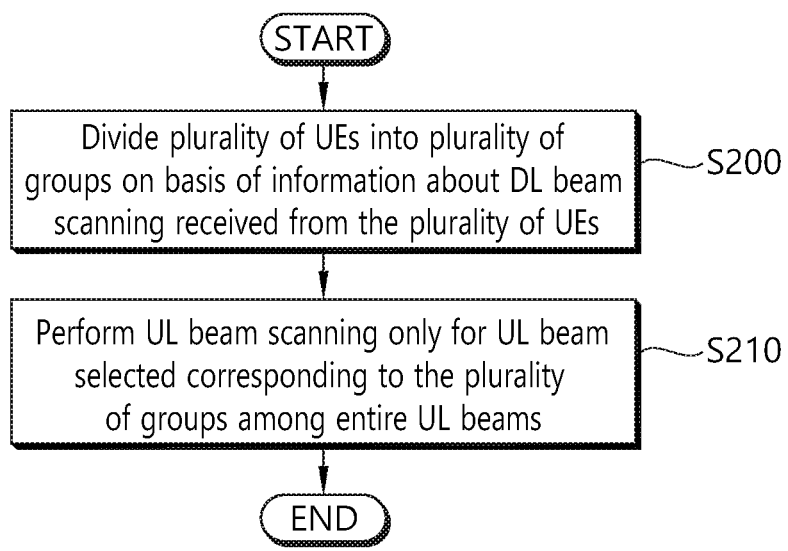
FIG. 13 illustrates a method for a base station to perform uplink beam scanning according to one embodiment of the present invention.

FIG. 13 illustrates a method for a base station to perform uplink beam scanning according to one embodiment of the present invention. Descriptions about the present invention given above may be applied to the embodiment of FIG. 13.

At step S200, the base station divides the plurality of UEs into a plurality of groups on the basis of the information about downlink beam scanning received from a plurality of UEs. UEs belonging to one of the plurality of groups may be oriented to face the same beam direction. Also, the same reception beamforming may be applied for the UEs belonging to one of the plurality of groups.

At step S210, the base station performs uplink beam scanning only for the uplink beam selected in accordance with the plurality of groups among the entire uplink beams. The uplink beam scanning may be performed in the uplink beam scanning period determined on the basis of the information about the downlink beam scanning. The length of the uplink beam scanning period may correspond to the number of the plurality of groups. The period in which no corresponding UEs exist among the uplink beam scanning periods may be set as a scanning muting period. Similarly, the length of the uplink beam scanning period may correspond to the number of groups having corresponding UEs among the plurality of groups. In other words, the base station may adjust the period and/or length of the uplink beam scanning period by taking into account the number of received beams for which no corresponding UEs exist.

The base station may broadcast information about length and period of the uplink beam scanning period over the plurality of UEs. Similarly, the base station may update the information about the length and period of the uplink beam scanning period when the information about the plurality of groups is changed. The period at which the information about the length and period of the uplink beam scanning period is updated may correspond to a multiple of a single uplink beam scanning period.

Figure 14:
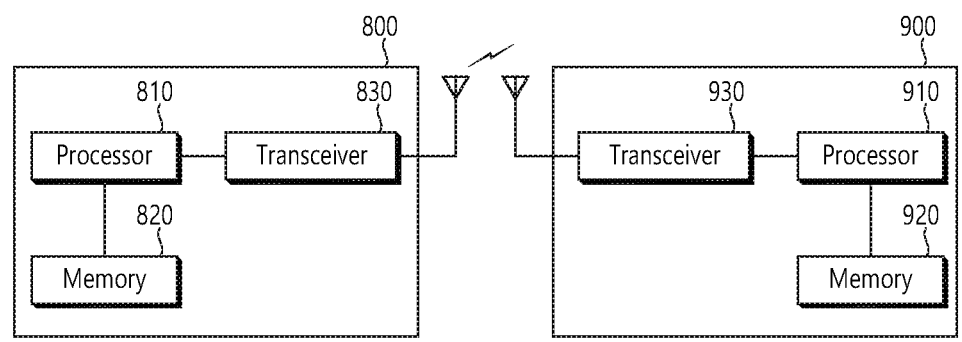
FIG. 14 shows a wireless communication system to implement an embodiment of the present invention.

FIG. 14 shows a wireless communication system to implement an embodiment of the present invention.

A base station 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a base station in a wireless communication system, the method comprising:
    transmitting downlink beam scanning signals to plurality of user equipments (UEs) via a first downlink beam, a second downlink beam and a third downlink beam;
    receiving information on a downlink beam scanning from the plurality of UEs, wherein the information on the downlink beam scanning informs that the first downlink beam and the second downlink beam are selected and the third downlink beam is not selected by the plurality of UEs as a result of respective downlink beam scanning by the plurality of UEs;
    configuring a first group of UEs related to the first downlink beam and a second group of UEs related to the second downlink beam;
    adjusting an uplink beam scanning period consisting of a first period for the first group of UEs and a second period for the second group of UEs; and
    performing an uplink beam scanning for the first group of UEs with a first pre-coder and for the second group of UEs with a second pre-coder based on the adjusted uplink beam scanning period,
    wherein the first pre-coder is same as the second pre-coder,
    wherein the adjusted uplink beam scanning period is determined by a number of UE groups based on the received information on the downlink beam scanning from the plurality of UEs,
    wherein configuration information for the adjusted uplink beam scanning period is broadcasted from the base station,
    wherein the configuration information is updated if grouping information of the plurality of UEs is changed, and
    wherein an update period of the configuration information is set to a multiple of a single uplink beam scanning period.

2. A base station in a wireless communication system, the base station comprising:
    a memory;
    a transceiver; and
    a processor, operably coupled to the memory and the transceiver, and configured to:
    control the transceiver to transmit downlink beam scanning signals to plurality of user equipments (UEs) via a first downlink beam, a second downlink beam and a third downlink beam;
    control the transceiver to receive information on a downlink beam scanning from the plurality of UEs, wherein the information on the downlink beam scanning informs that the first downlink beam and the second downlink beam are selected and the third downlink beam is not selected by the plurality of UEs as a result respective downlink beam scanning by the plurality of UEs;
    configuring a first group of UEs related to the first downlink beam and a second group of UEs related to the second downlink beam;
    adjusting an uplink beam scanning period consisting of a first period for the first group of UEs and a second period for the second group of UEs; and
    performing an uplink beam scanning for the first group of UEs with a first pre-coder and for the second group of UEs with a second pre-coder based on the adjusted uplink beam scanning period,
    wherein the first pre-coder is same as the second pre-coder,
    wherein the adjusted uplink beam scanning period is determined by a number of UE groups based on the received information on the downlink beam scanning from the plurality of UEs,
    wherein configuration information for the adjusted uplink beam scanning period is broadcasted from the base station,
    wherein the configuration information is updated if grouping information of the plurality of UEs is changed, and
    wherein an update period of the configuration information is set to a multiple of a single uplink beam scanning period.

* * * * *